United States Patent [19]

Von Osten

[11] Patent Number: 4,464,722
[45] Date of Patent: Aug. 7, 1984

[54] DATA INPUT OR OUTPUT APPARATUS INCORPORATING FUNCTIONAL TESTING

[75] Inventor: Reimer Von Osten, Siegen, Fed. Rep. of Germany

[73] Assignee: U.S. Philips Corporation, New York, N.Y.

[21] Appl. No.: 273,549

[22] Filed: Jun. 15, 1981

[30] Foreign Application Priority Data

Jun. 14, 1980 [DE] Fed. Rep. of Germany ....... 3022371

[51] Int. Cl.³ ...................... G06F 15/20; G01N 19/02
[52] U.S. Cl. ..................................... 364/551; 364/483
[58] Field of Search ............... 364/551, 580, 579, 483, 364/480–481; 324/71 R, 76 R

[56] References Cited

U.S. PATENT DOCUMENTS

| | | | |
|---|---|---|---|
| 3,839,628 | 10/1974 | Higgins et al. ...................... | 364/551 |
| 4,035,621 | 7/1977 | Kemp ................................... | 364/551 |
| 4,144,578 | 3/1979 | Mueller et al. .................. | 364/551 X |
| 4,184,205 | 1/1980 | Morrow ........................... | 364/550 X |
| 4,189,778 | 2/1980 | Vogel ............................... | 364/579 X |
| 4,376,298 | 3/1983 | Sokol et al. ......................... | 364/551 |

Primary Examiner—Edward J. Wise
Attorney, Agent, or Firm—Jack E. Haken; James J. Cannon, Jr.

[57] ABSTRACT

For functional testing, all electromechanical elements of a data input or output apparatus are individually and successively activated. The current supplied by a power supply is measured at least at one instant and the measurement value is compared with a reference value. Thus, the power supply lead need include only a (possibly switchable) measuring element and a customary A/D converter and possibly a measuring range controller, the further functional testing being realized by means of the digital units already present. Due to the small number of elements on the one hand, the reliability of the apparatus is not affected to any significant degree, while on the other hand the functional testing is thus realized in a very inexpensive manner.

4 Claims, 6 Drawing Figures

DATA INPUT OR OUTPUT APPARATUS INCORPORATING FUNCTIONAL TESTING

BACKGROUND OF THE INVENTION

1. Field of the Invention

The invention relates to a data input or output apparatus for a central data processing system, comprising electromechanical elements such as motors or magnets, an electronic control device for the exchange of data and control signals with the central data processing system and for generating internal control signals for the activation of the electromechanical elements, and also comprising a power supply device for supplying the electric energy for the electromechanical elements, said apparatus further comprising a measuring device for measuring a supply current drained from the power supply apparatus and supplying measurement values, said apparatus also comprising comparing means for comparing the measurement value to a reference value.

An apparatus from this kind is described in U.S. Pat. No. 3,839,628, which apparatus is provided with means for measuring the frequency spectrum distribution of the electric power applied to the drive motor during a standard operating cycle of the system.

In an apparatus of this kind it is customarily desirable to test the operability at frequent or regular intervals before the occurrence of malfunctioning which unnoticeably causes incorrect results or serious damage. A test of this kind can be performed during regular inspections by service personnel, but is then very complex and expensive. Therefore, a maximum amount of automatic functional testing by the apparatus itself is desirable.

2. Description of the Prior Art

In electronic data processing systems it is known to perform automatic functional testing of the electronic parts by the execution of a test program, notably when the system is switched on. Therefore, except for the test program or its space in the program memory, electronic systems of this kind require no or only few additional devices for the execution and evaluation of a complete test.

The drawback of the known apparatus is that it is possible to test only one electromechanical element, and that the test operation has to be done during the operating cycle of the system. This implies that the user needs to wait for a whole operating cycle in order to get some results of the test operation.

SUMMARY OF THE INVENTION

Therefore, the invention has for its object to provide a data input or output apparatus of the kind set forth in which the operability of a plurality of electromechanical elements is automatically tested, without the reliability of the complete system being affected to any important extent, thereby. This object is achieved in accordance with the invention in that the input or output apparatus comprises a measuring range controller, connected to said control device and having an output connected to an input of a measuring device, which measuring device comprises several measuring elements, said measuring range controller being provided with a first circuit for selecting a measuring element under control of a selection signal generated by the control device for the selected electromechanical element to be tested, said measuring device having an output connected to an input of the control device, said measuring device being provided with a second circuit for measuring under control of a first activation signal a supply current drained from the power supply device and for generating a measurement value on the base of said measured supply current, after reception of a control signal generated by the control device upon reception of a timing signal generated at a defined instant after the generation of said first activation signal. Due to the use of a measuring range controller and a measuring device comprising several measuring elements it is now possible to measure the current consumption of a plurality of electromechanical elements. The reliability of the apparatus is not affected to any significant extent while on the other hand extensive testing is possible at very little cost and without being necessary to execute a complete operating cycle.

Data input or output apparatus often comprise very diverse electromechanical elements which can differ substantially, for example, as regards response time. Therefore, it is advantageous that on said first activation signal being a brief activation signal causing only an unimportant mechanical change of the state in comparison to a mechanical change during normal operation of the selected electromechanical element the basis of the current variation during such a brief actuation, it can at least be unambiguously determined whether or not such an element is electrically in order, i.e. whether there is, for example, a broken wire or a short-circuit, and usually the basic mechanical operability can also be deduced therefrom, because in the case of mechanical blocking or a mechanical fracture the variation in time of the current already deviates at the start from that of an element which is in order.

Electromechanical elements customarily have an active state and a rest state. A given current value is associated with each state. Preferably, a data input or output apparatus in accordance with the invention is characterized in that the control device takes over the measurement value of the measuring device directly before and after the activation signal and compares the difference between the two measurement values with a stored difference value. Due to the fact that the difference between the current value in the rest state and that in the active state is determined and that this difference is compared with a difference value stored in the memory, the test procedure can be more accurately performed.

Often electromechanical elements are included in which a motion can be controlled in two opposite directions, for example, the positioning of an arm which supports a magnetic head for writing/reading data on or from a magnetic disc. It is then advantageous that the control device generates for at least some of the electromechanical elements a further activation signal after the taking over of the measurement values, said further activation signal initiating a movement of the relevant electromechanical element to the state before the first activation signal. In these cases complete functional testing is possible, but it is also ensured that the state after the test is the same as the initial state.

Because two essentially different types of faults can occur in most electromechanical elements, that is to say breaking of a wire or a force-transmitting mechanical part which involves only a small current increase upon activation, or a short-circuit or mechanical blocking which causes an excessive current increase, the control device preferably compares at least part of the measurement values with two reference values stored and generates an error signal if the relevant measurement values exceed the one reference value or fail to exceed the other reference value. Both types of faults can thus be very simply tested.

For the processing of digitized measurement values it is advantageous that the control device forms the difference between a measurement value taken over after the activation signal and the current measurement value taken over and stored directly before the activation signal and compares this difference with at least one digital reference value stored in a read-only memory. This digital storage of reference values is particularly reliable and simple.

In the case of more complex apparatus, however, the control device is preferably formed by a microprocessor which is controlled by a program which is stored in a read-only memory. The read-only memory can then be used for the program as well as for the digital reference values, so that the testing of the electromechanical elements requires only an extremely small additional expenditure.

Different electromechanical elements having notably different response times generally also have essentially different rates of change of the current consumption in reaction to an activation signal. Therefore, in order to enable optimum testing of the various elements when use is made of a control device in the form of a microprocessor, the microprocessor preferably activates a programmable timer after each take-over of a measurement value, after expiration of the programmed period of time the timer applying an interrupt signal to the microprocessor in order to make the microprocessor take over the next current measurement value or generate another control signal for another electromechanical element. Thus, the separate time intervals of the measurement of a current measurement value or the sequence of the activation signals can be chosen completely independently.

BRIEF DESCRIPTION OF THE DRAWINGS

Embodiments in accordance with the invention will be described in detail hereinafter with reference to the accompanying diagrammatic drawings. Therein.

DESCRIPTION OF THE PREFERRED EMBODIMENT

Figure 1:
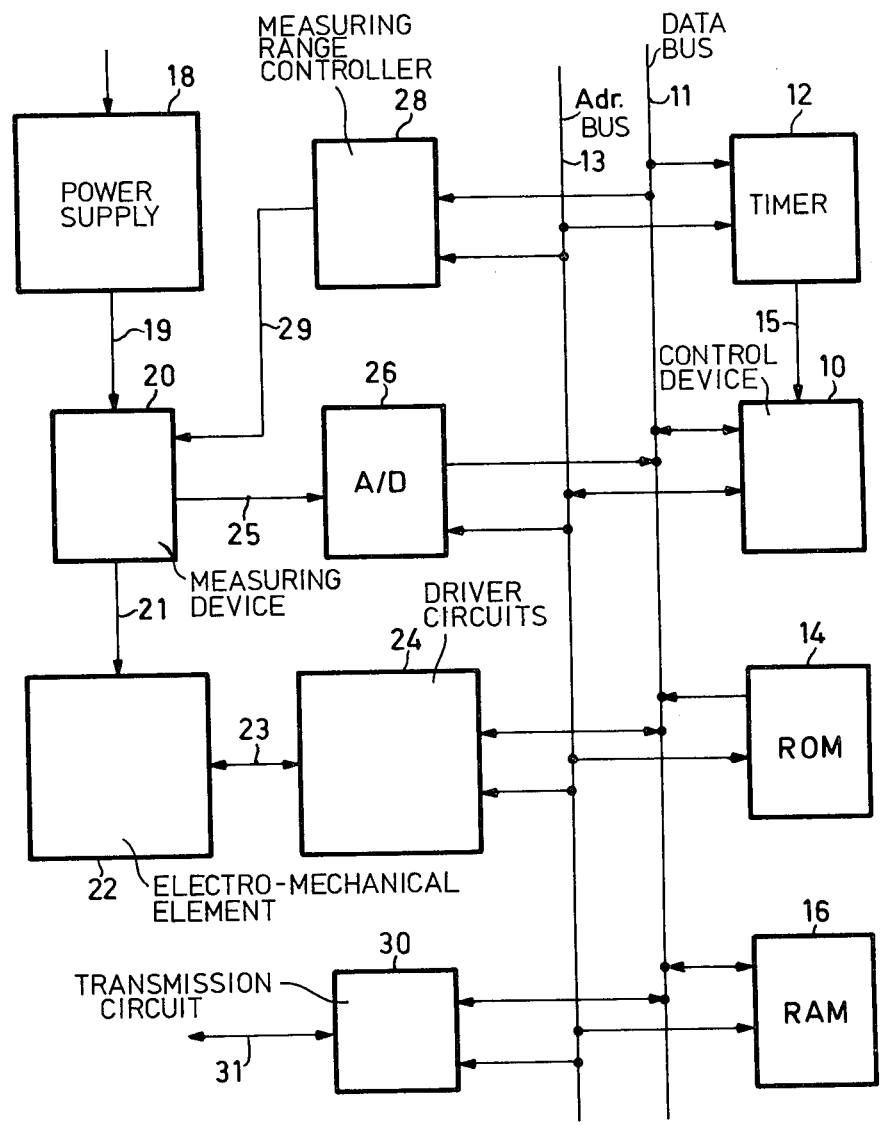
FIG. 1 shows a block diagram of a device in accordance with the invention.

FIG. 1 shows a block diagram of an embodiment of a device in accordance with the invention. The block diagram shows the most essential elements which are interconnected by means of a data bus 11 and an address bus 13. An essential element is formed by the control device 10 which controls all functions and hence also the test procedures.

The electromechanical elements are represented in simplified form by a block 22, because the exact construction of the elements is not important within the context of the present invention. The elements receive electric energy, from the power supply 18 via the lead 19, the measuring device 20 which comprises several measuring elements and the lead 21. The power supply 18 being connected to the mains and comprising notably rectifiers and filters in order to form one or more d.c. voltages. The electromechanical elements in the block 22 are activated, via the lead 23, by driver circuits which are included in the block 24 which also includes, for example, position detectors for the electromechanical elements such as the printing head of a printer and also, for example, limit switches and other elements for converting a mechanical state into an electric signal. The block 24 is connected to the address bus 13 and to the data bus 11 and receives therefrom the control signals for activating the electromechanical elements or applies the signals derived from the detected mechanical states to the data bus 11. The powering of the other elements has been omitted for the sake of simplicity.

Via the lead 29, the measuring device 20 is activated by the measuring range controller 28 in order to adjust the most favorable measuring range for the relevant electromechanical element, as is customary in digital measuring instruments. The measuring range controller 28 is also connected to the address bus 13 and the data bus 11, the former determining the measuring range controller and the measuring range being selected by data which are present at the same time or directly thereafter. Like with some other elements, the selection can also be realized via additional, separate control leads from the control device 10 which are not shown in the drawing.

The measuring device 20 generally comprises a number of measuring resistors which are switched on by a switch which is included therein and which is controlled by the measuring range controller 28. However, because occasionally current variations are evaluated, it may be advantageous to use at least for some measurements general impedances with an inductive component instead of purely ohmic measuring elements. Variations in time of currents [dI/dt] can be measured by means of a coil. For the actual operation after completion of the testing of the electromechanical elements, it may also be advantageous to replace the measuring element by a short-circuit so that the electric energy supplied by the power supply 18 completely reaches the electromechanical elements 22 with an as low as possible ohmic value.

Via the lead 25, the measuring device 20 has connected to it an analog/digital converter 26 which is in this case activated by the address bus 13 in order to supply a digitized measurement signal which is applied to the data bus 11.

Also connected to the data bus 11 and the address bus 13 are a read-only memory (ROM) 14 and a random-access memory (RAM) 16 and also a timer 12, the output of which is connected to the control device 10 via the lead 15. When the timer is selected, the data on the data bus 11 adjust the timer to a period of time after expiration of which a signal is supplied on the lead 15. The timer 12 thus essentially consists of a counter and may also form part of the control device 10; however, it is shown separate therefrom for the sake of clarity.

Also connected to the buses 11 and 13 is a transmission circuit 30 which provides the data traffic with the central data processing system via the lead 31. An essential part of the leads shown in this Figure, for example, the buses 11 and 13, actually consist of a number of separate parallel leads which are shown as only one connection for the sake of simplicity.

An Embodiment in Accordance with the Invention

Figure 5:
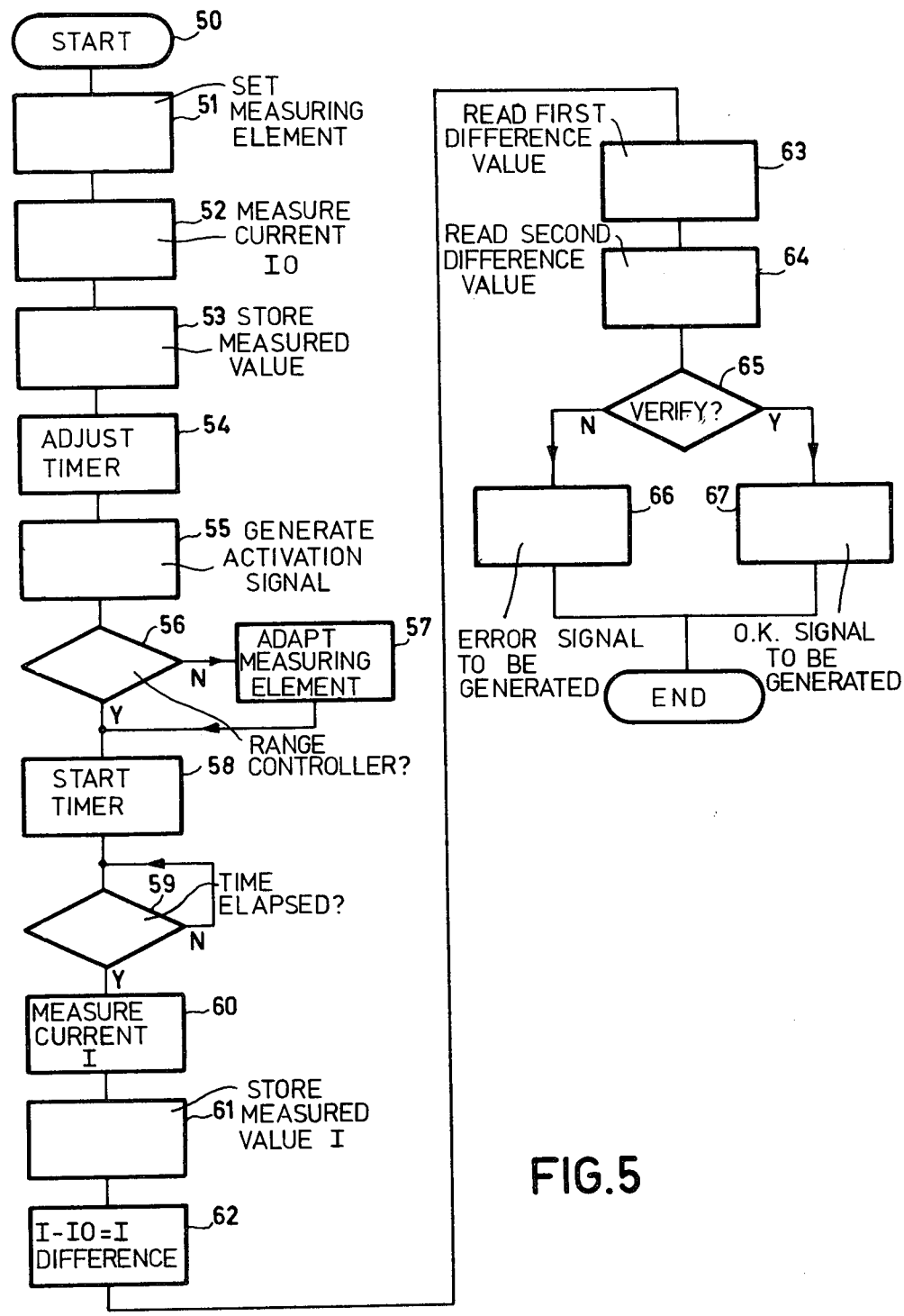
FIG. 5 is a flow chart showing a test route according to the invention.

FIG. 5 shows in the form of a flow diagram a test routine for testing an electromechanical element. After starting (50) (for example after the reception of a command given by a user) the measuring range controller 28 is activated (51) under control of the control device 10, for switching on a given measuring range or a given measuring element. Then a current $I_o$ is measured (52) and the analog-to-digital converter 26 is activated. The output digital value is stored (53) in a given storage location in the RAM 16.

The timer 12 is now adjusted (54) by the control device to a period of time necessary for activating the electromechanical element 22 to be tested.

Further the control device generates (55) an activation signal for a given driver 24, which initiates the electromechanical element 22 to be tested. The control device then verifies (56) if the measuring range controller 28 has to switch a different measuring element of the measuring device 20. If this is the case (Y) (for example when a large value of current has to be measured) another measuring element is switched (57) by the measuring range controller. After the switching of another measuring element or in the case that the measuring element set (Y) in step 51 can be used, the time 12 is started by the control device. The control device then waits (59) until the setted period of time is elapsed and then a current I is measured (60).

The analog-to-digital converter 26 is activated again and the output digital measurement value I is stored in the RAM 16 (61). Under control of the control device the measurement value $I_o$ previously stored in the RAM 16 is read even as the measurement value I, and the difference $I_{diff}=I-I_o$ between these two values is determined (62), this measured difference value is stored in RAM 16. From the ROM 14 a first (63) and then a second (64) given difference value for the electromechanical element to be tested is read. The control unit then verifies (65) if the measured difference value deviates from the first and the second given difference value. This verification can be ralized in known manner by differentiation, the exceeding of or the decreasing below the value 0 being considered an excessive deviation.

When the permissible deviation is exceeded, either an error signal is applied 66 to the central processing system via the transmission circuit 30 and the lead 31, or via the relevant driver 24 an error signal is applied to the electromechanical element 22, said error signal causing, for example, the flashing of a lamp. Otherwise, in case that the permissible deviation is not exceeded (Y) an OK signal is generated (67) by the control unit. After the steps 66 or 67 the test routine is finished.

If several successive current values have to be measured during activation of an electromechanical element, step 61 is followed by the following step:

Storage of the value taken over in the control device 10 from the analog/digital converter in a special storage location in the RAM 16, followed by a jump to step 58; if necessary, this loop is completed a given number of times, for example, the count of a set counter being changed by each completion. During step 62, several differences are then formed, i.e. the difference between each measurement value and the measurement value first stored, said several difference values being compared with a corresponding number of difference values from the ROM 14. It is also possible to form partial differences with respect to further successive measurement values for comparison with difference values stored in the ROM 14.

It is alternatively possible to measure curves which represent the current variations as a function of time in order to compare these curves with reference curves.

The measurement of two values and the determination of the difference between these two values represents only one possibility. Obviously, it is also possible to test the functioning of an electromechanical element by measuring only one value. For example, for testing the functioning of the paper transport mechanism in a printer it is sufficient to measure only one value. The current consumption of the motor for rotating the drive roller one step further provides adequate information concerning the functioning of the transport mechanism in this example. The control device then compares the value measured with a reference value stored in the ROM 14.

The various function steps described above will be illustrated hereinafter, by way of example, with reference to an embodiment of a printing head of a matrix printer.

The control unit 10, for example, a microprocessor, includes a program which controls the various described function steps during the printing of a given character, for example, the character M.

Figure 2A:
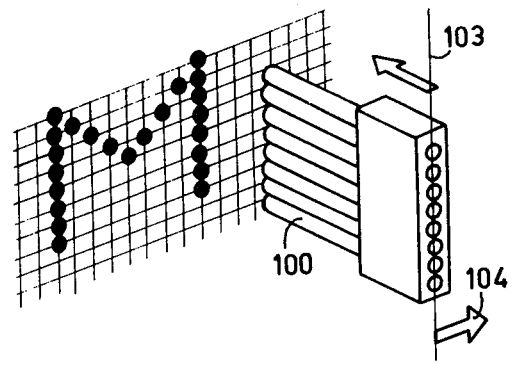
FIG. 2a shows a printing head of a matrix printer, viewed on the side which contacts the ribbon and the paper.
Figure 2B:
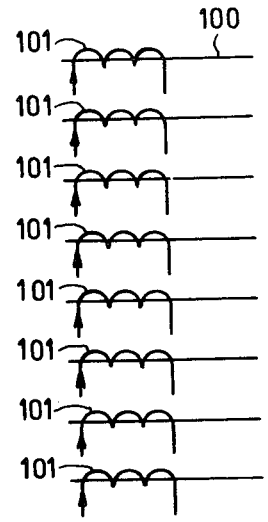
FIG. 2b is a cross-sectional view of the printing head, taken along the line 103.

FIG. 2a shows a printing head of a matrix printer, viewed on the side which contacts a ribbon and the paper, and FIG. 2b is a cross-sectional view of the printing head in the direction of the plane determined by the line 103. The printing head comprises eight needles 100 which are arranged in a column. Each of these needles is at least partly situated within the core of a coil 101. A character is printed by step-wise displacement of the printing head in the direction of the arrow 104 and by applying during each step a current I to the coil (coils) which must move their needle to the paper in order to print the relevant character. With each character there is associated a given current $I_{KAR}$ which is the sum of all currents I required to print the relevant character. For example, a current $I_M$ is required to print the character M.

In order to keep the needles in their rest position, usually a small current Io (quiescent current) is passed through the coils. The force exerted on the needle by the magnetic field of the coil 101 keeps the needle in its rest position. A current I (I≠Io) through the coil induces a magnetic field whereby a force is exerted on the coil which moves the needle to the paper.

Figure 3:
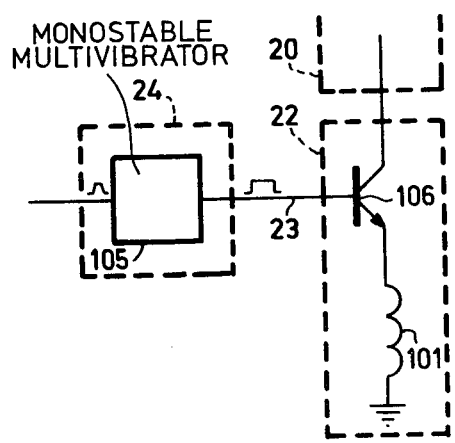
FIG. 3 shows an embodiment of a drive element.

FIG. 3 shows an embodiment of the drive element 24. The element 24 comprises, for example, one or more monostable multivibrators 105 which are set and reset by a pulse-shaped control signal which is supplied by the microprocessor 10. In the one state, the multivibrator applies a square-wave pulse to the electromechanical element 22 via the connection 23.

The element 22 comprises the coils 101 and for each coil a transistor 106. For the sake of clarity, FIG. 3 shows only one transistor and one coil. The square-wave pulse supplied by the multivibrator 105 is applied to the base of the transistor 106, so that the latter becomes conductive and the current I flows through the coil, thus inducing a magnetic field therein. When the multivibrator is in the other state, the transistor is not conductive.

The operation of the printing head of the matrix printer is tested by applying the test routine illustrated in FIG. 5. During the execution of the test routine the printing head of the matrix printer prints for example the character M. The following function steps are executed when the test routine is started.

Figure 4:
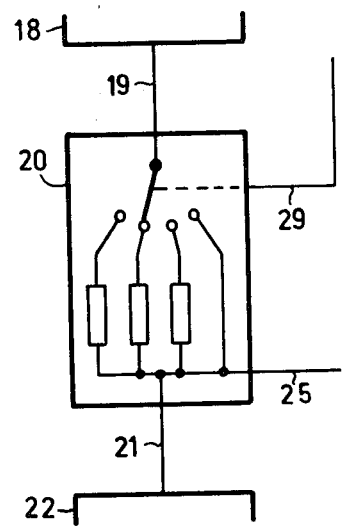
FIG. 4 shows an embodiment of a measuring element.

(1) The measuring range controller 28 which comprises, for example, a decoder, is activated and switches step 51 a suitable impedance in the measuring device 20 in order to measure the quiescent current Io. FIG. 4 shows an embodiment of such a measuring element in which resistors are used as the impedances.

(2) Analog/digital converter 26 is activated and the quiescent current Io measured is stored in digitized form in RAM 16. Steps 52, 53.

(3) The measuring range controller 28 switches on a suitable resistor in the measuring element 20 for measuring $I_M$. Steps 56, 57.

(4) The timer 12 is adjusted for the period of time required for the printing of the character M. Step 58.

(5) The control device 10 generates the control signal for the driving of the printing head and for the printing of the character M by the printing head. Step 59.

(6) After the output signal of the timer 12, Y, step 59 the analog/digital converter 26 is activated again and the measured value $I_M$ is stored in the memory of the control device 10 in digitized form. Step 60.

(7) The measured value of the quiescent current (Io) stored in the memory 16 is read and the control device 10 determines the difference $I_M - Io = I_{Mo}$. Steps 61, 62.

(8) The reference value $I_{RM}$ stored in the memory 14 is read (Step 63).

(9) The control device 10 compares $I_{RM}$ with $I_{MO}$. (Step 65).

(10) If there is adequate correspondence between the reference value and $I_{MO}$, the program continues. Step 67. If the correspondence is not adequate, an error signal is generated. Step 66. During the comparison, given tolerances can be taken into account. For example, in this example in which digital values are compared, the bit value of the least-significant bit (bits) may be neglected.

(11) If an error signal is generated, for example, a visual indication is given by the lighting up of a signal lamp on the printer.

What is claimed is:

1. A data input or output apparatus for a central data processing system, which system comprises a plurality of electromechanical elements, said apparatus comprising:
   (a) an electronic control device for the exchange of data and control signals with the centrol data processing system and for generating activation signals for activating at least one electromechanical element;
   (b) a power supply device for supplying electric energy to all the electromechanical elements;
   (c) a timer for generating timing signals, said timer being connected to the control device;
   (d) a measuring range controller, connected to said control device and having an output connected to an input of a measuring device, which measuring device comprises several measuring elements, said measuring range controller being provided with first means for selecting a measuring element under control of a selection signal generated by the control device for the selected electromechanical element to be tested, said measuring device having an output connected to an input of the control device, said measuring device being provided with second means for measuring under control of a first activation signal a supply current drained from the power supply device and for generating a measurement value on the base of said measured supply current after reception of a control signal generated by the control device upon reception of a timing signal generated at a defined instant after the generation of said first activation signal;
   (e) comparing means connected to said control device for comparing the measurement value with at least one reference value and for generating an error signal in reaction to a given deviation of the measurement value from the reference value.

2. A data input or output apparatus as claimed in claim 1, wherein said first activation signal is a brief activation signal causing only an unimportant mechanical change of the state in comparison to a mechanical change during normal operation of the selected electromechanical element.

3. A data input or output apparatus as claimed in claim 1 or 2, wherein said second means of said measuring device is also provided for measuring under control of a second activation signal, which causes a mechanical change of the state of the selected electromechanical element, a further supply current drained from the power supply device and for generating a second measurement value on the base of the measured second supply current, said control device being further provided for determining the difference between said first and the second measurement value, said comparing means being provided for comparing said determined difference to a reference difference value, and for generating an error signal in reaction to a given deviation of the determined difference from the reference difference value.

4. A data input or output apparatus as claimed in claim 3, wherein the control device (10) generates a third activation signal at the selected electromechanical element after the taking over of the measurement value, said third activation signal initiating a movement of the selected electromechanical element to the position occupied before the first activation signal.

* * * * *